United States Patent
Ullmann et al.

(10) Patent No.: US 6,683,627 B1
(45) Date of Patent: Jan. 27, 2004

(54) SCROLL BOX CONTROLS

(75) Inventors: Cristi Nesbitt Ullmann, Austin, TX (US); Lorin Evan Ullmann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 467 days.

(21) Appl. No.: 09/671,064

(22) Filed: Sep. 28, 2000

(51) Int. Cl.$^7$ .................................................. G09G 5/00
(52) U.S. Cl. ........................................ 345/786; 345/973
(58) Field of Search ................................ 345/856–862, 345/865, 157, 159, 160, 973–974, 784–786

(56) References Cited

U.S. PATENT DOCUMENTS

| | | | | |
|---|---|---|---|---|
| 5,553,225 A | * | 9/1996 | Perry | 345/786 |
| 5,655,094 A | * | 8/1997 | Cline et al. | 345/786 |
| 5,732,228 A | * | 3/1998 | Jaaskelainen, Jr. | 345/862 |
| 6,069,626 A | * | 5/2000 | Cline et al. | 345/786 |
| 6,448,986 B1 | * | 9/2002 | Smith | 345/801 |

* cited by examiner

Primary Examiner—Sy D. Luu
(74) Attorney, Agent, or Firm—David A. Mims, Jr.; Robert V. Wilder

(57) ABSTRACT

A method and implementing computer system are provided in which a user is able to customize pointer movements on a display screen corresponding to physical mouse movements. In an exemplary embodiment, a menu is presented on a display screen to allow a user to select and customize sensitivity settings for mouse movements. Further controls are selectively implemented to limit pointer movement along predetermined axes. Another feature enables a user to define screen areas surrounding function buttons or hyperlinks such that a user-controlled pointer movement in proximity to any sensitized area will automatically highlight the closest hyperlink or function for subsequent selection and/or actuation by the user. Another user selection enables a user to select various features regarding scroll boxes presented on a display screen within a browser program. The scroll box controls enable a user to define the size of scroll boxes as well as pointer interaction with regard to displayed scroll boxes.

19 Claims, 7 Drawing Sheets

SCROLL BOX CONTROLS

RELATED APPLICATIONS

Subject matter disclosed and not claimed herein is disclosed and claimed in related co-pending application Ser. Nos. 09/671,062 and 09/671,063, which are assigned to the assignee of the present application and included herein by reference.

FIELD OF THE INVENTION

The present invention relates generally to information processing systems and more particularly to a methodology and implementation for controlling display features in a display screen environment.

BACKGROUND OF THE INVENTION

In networked computer systems, a plurality of computers are connected together and one or more of the computers generally performs the function of a network server. A network may be established through the hard-wired interconnection of a plurality of computer terminals in a local network or on a wider scale such as the Internet or World Wide Web (WWW) which may include telecommunication links. In any case, the network server acts as the central control unit for providing access to files, programs and program execution to the individual computers connected within the network. In general, a networked computer terminal will "logon" to the network and obtain access to a network server. The network server will download a homepage presentation on the user's terminal which may include audio and video effects. From the initial screen display, a user may designate any other "address" to get to another "location" or Web page screen display. The user may also select from a plurality of functions which may be presented for user selection on the initial display.

All of the above operations are typically performed by the movement of a mouse or pointer device to a selected screen location which contains indicia representative of a user-desired function or web site address. When the pointer device is pointing to the desired screen area, the user then "clicks" or presses a button on the mouse or other pointer device to actuate the selected function or transfer to the selected address.

Workstation or PC (personal computer) display screen sizes can vary in size. With more information and options presented to users of the Internet for example, it is more desirable to have larger screens to facilitate viewing of the many options and "hyperlinks" presented. However, for handicapped individuals and individuals with only limited range of hand motion, mouse or pointer device movement becomes an obstacle in navigating through the Internet, and even a greater problem when larger screens, such as workstation displays, are utilized. For individuals with limited movement capabilities, it is very difficult to move a pointer, using a mouse or similar device, across a screen display in order to highlight a selected hyperlink or function indicium located at the opposite side of the display.

Moreover, present scrolling techniques are also difficult to manage for those with limited movement capabilities since typically a scrolling arrow must be over an "arrow-down" indicium on the display and then the actuate button must either be held down while the screen advances one line at a time, or individual clicks must be sequences to scroll down a line at a time. This function is quite difficult for many handicapped individuals. Moreover, the granularity of input distance that constitute movements is assumed to be the same for all uses. A person who cannot move the mouse in fine movements cannot currently have input mouse movements tuned to that person's capabilities in terms of the amount of linear distance traveled. Someone with very limited motor control may move across the edge of a displayed page since currently no boundaries exist which define a maximum distance that the mouse can move or which define the granularity or sensitivity of the pointer movement in response to a mouse movement. For individuals with limited motor control, it would also be desirable to be able to provide smooth cursor movements on a display screen which correspond in general to a user's mouse movement while being relatively non-responsive to irregular mouse movement inputs from a user.

Thus, there is a need for an improved processing methodology and implementation for enabling control of various aspects of displayed scroll boxes to facilitate the use of such boxes.

SUMMARY OF THE INVENTION

A method and implementing computer system are provided in which a user is able to customize the appearance of scroll boxes generated by an application on a user's display screen. In an exemplary embodiment, a user is enabled to establish the relative size and shape of displayed scroll boxes in order to facilitate the use of the scroll boxes.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
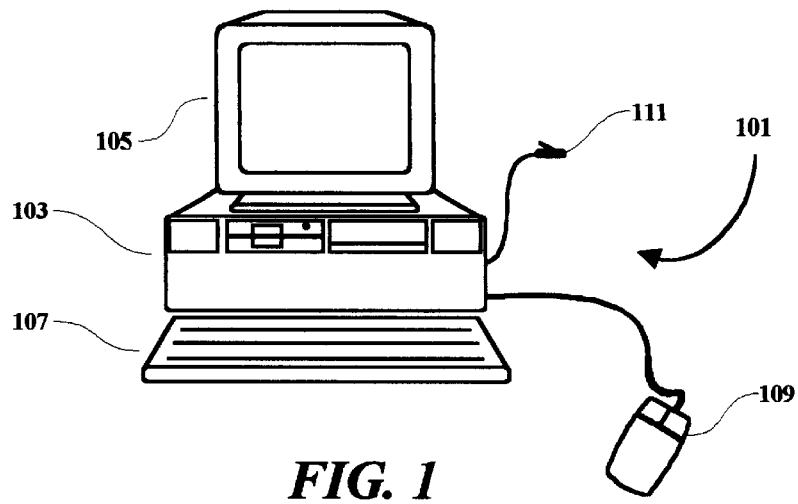
FIG. 1 is a diagram of a computer system in which the present invention may be implemented.

With reference to FIG. 1, the various methods discussed herein may be implemented within a computer network including a computer terminal 101, which may comprise either a workstation or a PC for example. In general, an implementing computer system may include computers configured with a plurality of processors in a multi-bus system in a network of similar systems. However, since the workstation or computer terminal 101 implementing the present invention in an exemplary embodiment, is generally known in the art and composed of electronic components and circuits which are also generally known to those skilled in the art, circuit details beyond those shown, are not specified to any greater extent than that considered necessary as illustrated, for the understanding and appreciation of the underlying concepts of the present invention and in order not to obfuscate or distract from the teachings of the present invention.

In FIG. 1, the computer system includes a processor unit 103 which is typically arranged for housing a processor circuit along with other component devices and subsystems of the computer terminal 101. The computer terminal 101 also includes a monitor or display unit 105, a keyboard 107 and a mouse or pointing device 109, which are all interconnected with the computer terminal illustrated. In special applications for individuals with limited movement capabilities, a customized mouse or pointer device is implemented and the use herein of the term "mouse" is intended to include such specialized devices which are used to move a pointer within a display screen. Also shown is a connector 111 which is arranged for connecting a modem within the computer terminal to a communication line such as a telephone line to access an Internet Service Provider (ISP) for example. The present invention may also be implemented in a cellular system.

Figure 2:
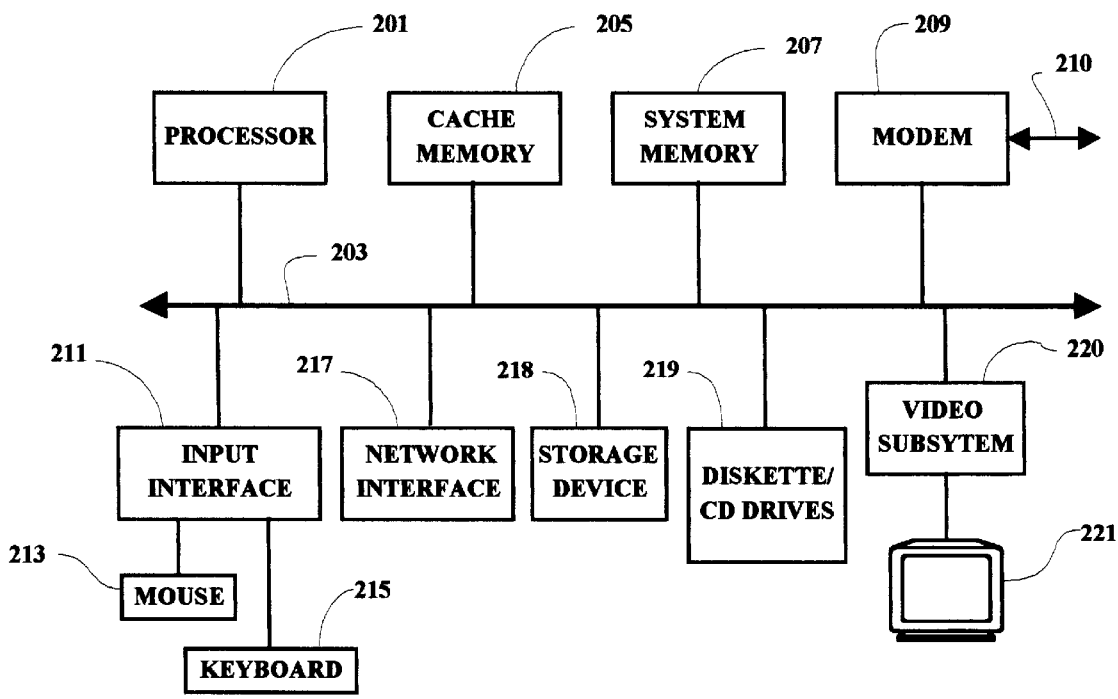
FIG. 2 is a simplified schematic diagram showing selected components and subsystems of the computer system illustrated in FIG. 1.

Several of the major components of the terminal 101 are illustrated in FIG. 2. A processor circuit 201 is connected to a system bus 203 which may be any host system bus. It is noted that the processing methodology disclosed herein will apply to many different bus and/or network configurations. A cache memory device 205, and a system memory unit 207 are also connected to the bus 203. A modem 209 is arranged for connection 210 to a communication line, such as a telephone line, through a connector 111 (FIG. 1). The modem 209, in the present example, selectively enables the computer terminal 101 to establish a communication link and initiate communication with an ISP for example, to establish subsequent connections to selected Web sites.

The system bus 203 is also connected through an input interface circuit 211 to a mouse or pointing device 213 and also to a keyboard 215. The bus 203 may also be coupled through a hard-wired network interface subsystem 217. A diskette and/or CD drive unit 219 is also shown as being coupled to the bus 203. A video subsystem 220, which may include a graphics subsystem, is connected to a display device 221. A storage device 218, which may comprise a hard drive unit, is also coupled to the bus 203. The diskette/CD drive unit provides a means by which individual diskette/CD programs may be loaded into the system for selective execution by the computer terminal 101. As is well known, program diskettes/CDs containing application programs represented by indicia on the diskette/CD, may be read from the diskette/CD drive, and the computer system is selectively operable to read such indicia (e.g. magnetic or optical) and create program signals. Such program signals are selectively effective to cause the computer system to present displays on the screen of a display device and respond to user inputs in accordance with the functional flow of the application program being run.

In running an Internet access program or "browser" program on the computer terminal 101, the access program is typically stored in the storage device 218 and either selectively or automatically, partially or totally, loaded into the system memory 207 when the system is initially powered-on, or at a later time if so desired by a user. The browser is selectively operable to access selected Web sites.

Depending on specific program design, the system may store any information accessed from a database in the storage unit 218, the cache memory 205, the system memory 207 or directly from a diskette loaded into the diskette drive 219. Assuming user has started-up the system, and is actively running a browser program for example, from memory, a series of screens will be displayed to the user on the display device 221. Each screen typically has one or more selections for the user to make in navigating through the browser program. In general, a user will make selections from a home page display screen using the keyboard 213 or the mouse or pointer device 215. Within the browser, the selections made by the user will determine "where" the user "goes", i.e. to what "site" or "Web page", and also, in some cases, the communications link or the path taken to get to the site selected.

Figure 3:
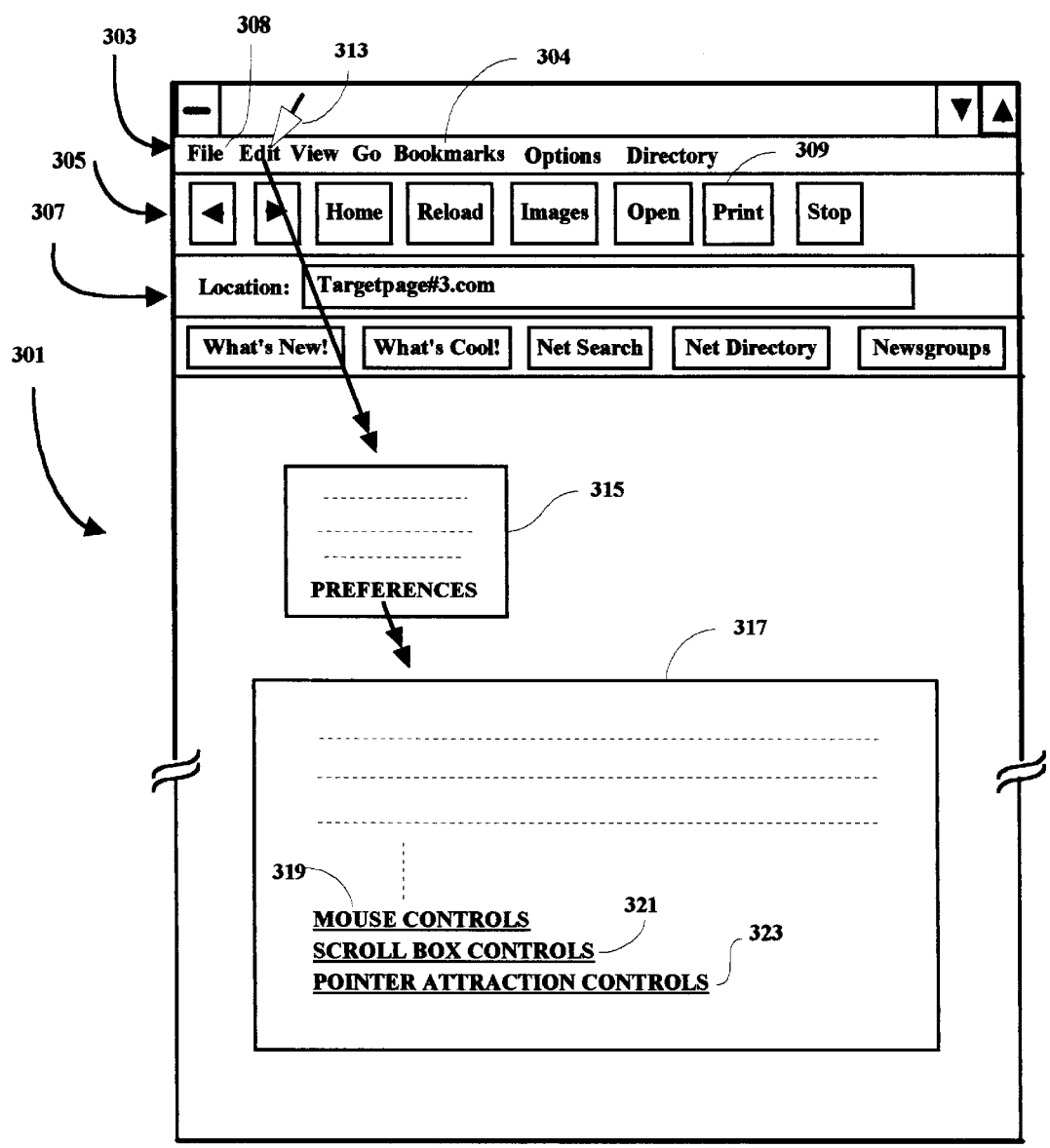
FIG. 3 is exemplary illustration of a Web page displayed within a browser application and showing several aspects of the present invention.

FIG. 3 illustrates a typical browser screen display 301 in an Internet operating session. The exemplary browser screen generally includes a function row 303 which displays several different functions which the user may select such as the "File" selection 308 or a "Bookmarks" selection 304. Another row 305 may be displayed to help a user quickly move through documents, sites, or pages in a network application. An address or "location" section 307 enables a user to key-in, and also displays, the name of an Internet address of a site to be, or being, visited. In general, any of the illustrated items may be selected through a "point and click" methodology associated with the mouse device 213 (FIG. 2), and a cursor or pointer 313 visible on the display screen 301. For example, a download of data from a remote site may be immediately terminated during the transmission by pointing to the "Stop" button and clicking on a designated mouse button. Similarly, the "Back" and "Forward" arrows or buttons may be used to return to the last screen display or go forward to the next screen display, respectively.

Figure 4:
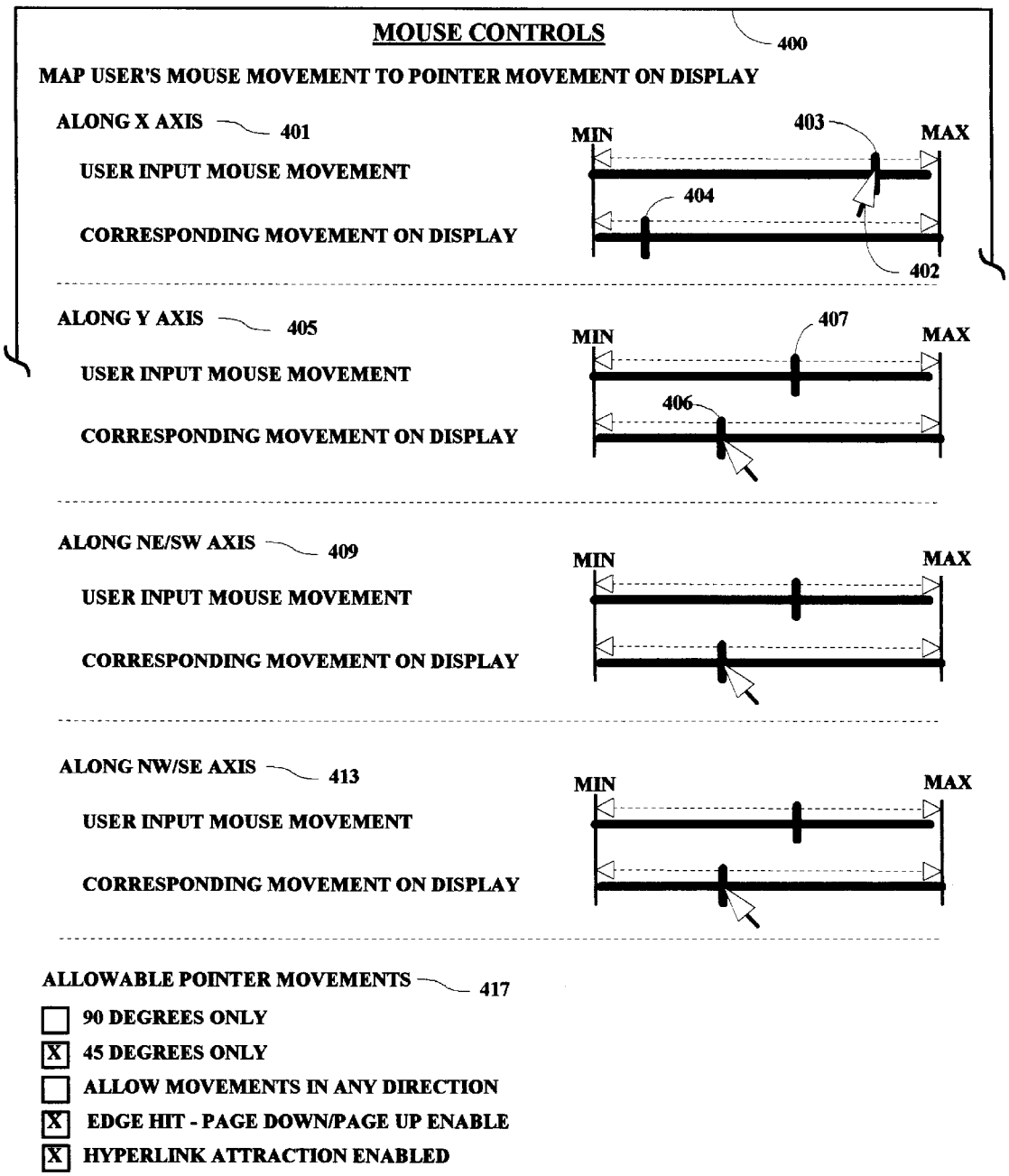
FIG. 4 is an exemplary screen display illustrating a selective pointer movement control implementation.
Figure 5:
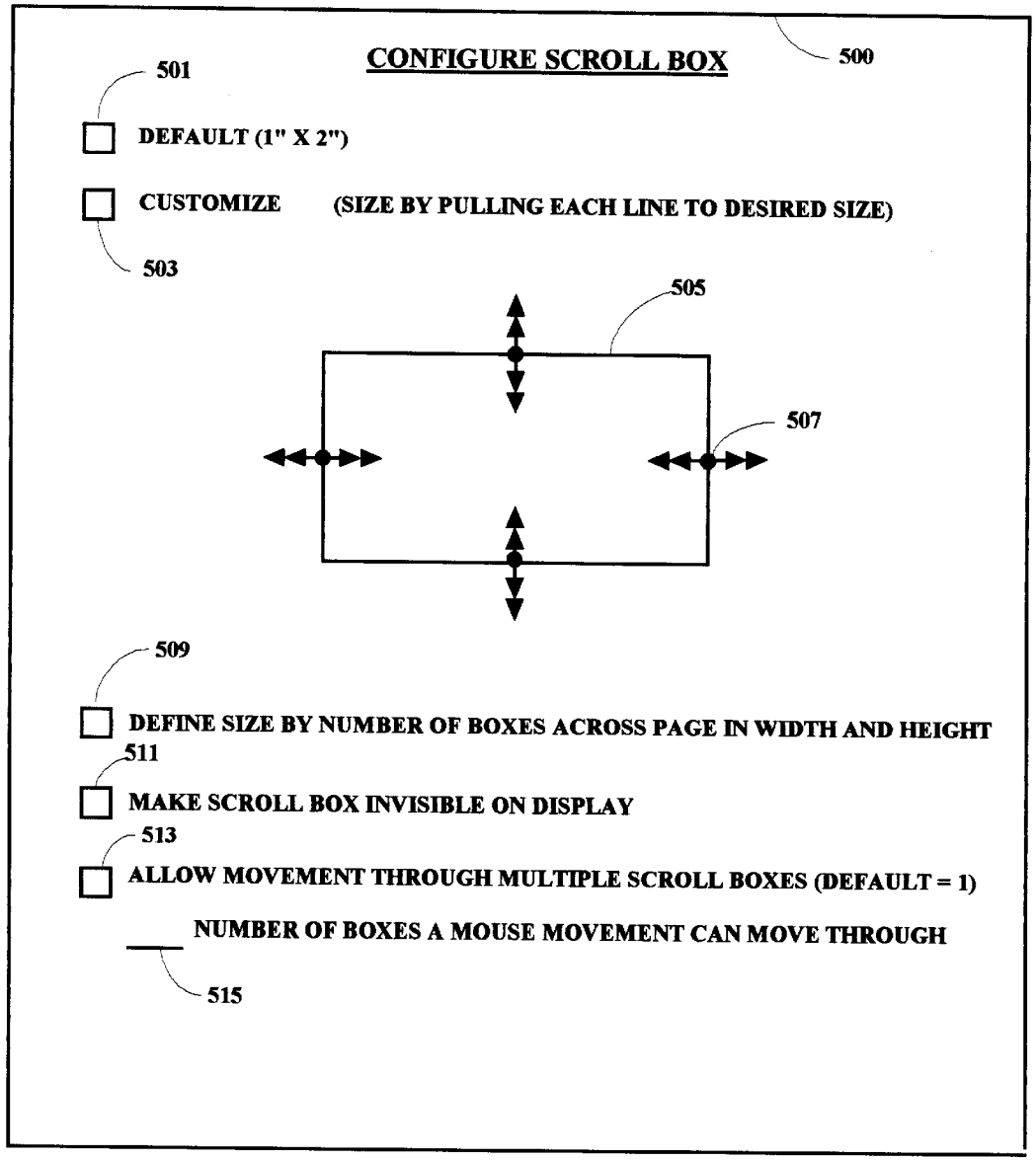
FIG. 5 is an exemplary screen display illustrating a scroll box configuration control implementation.
Figure 6:
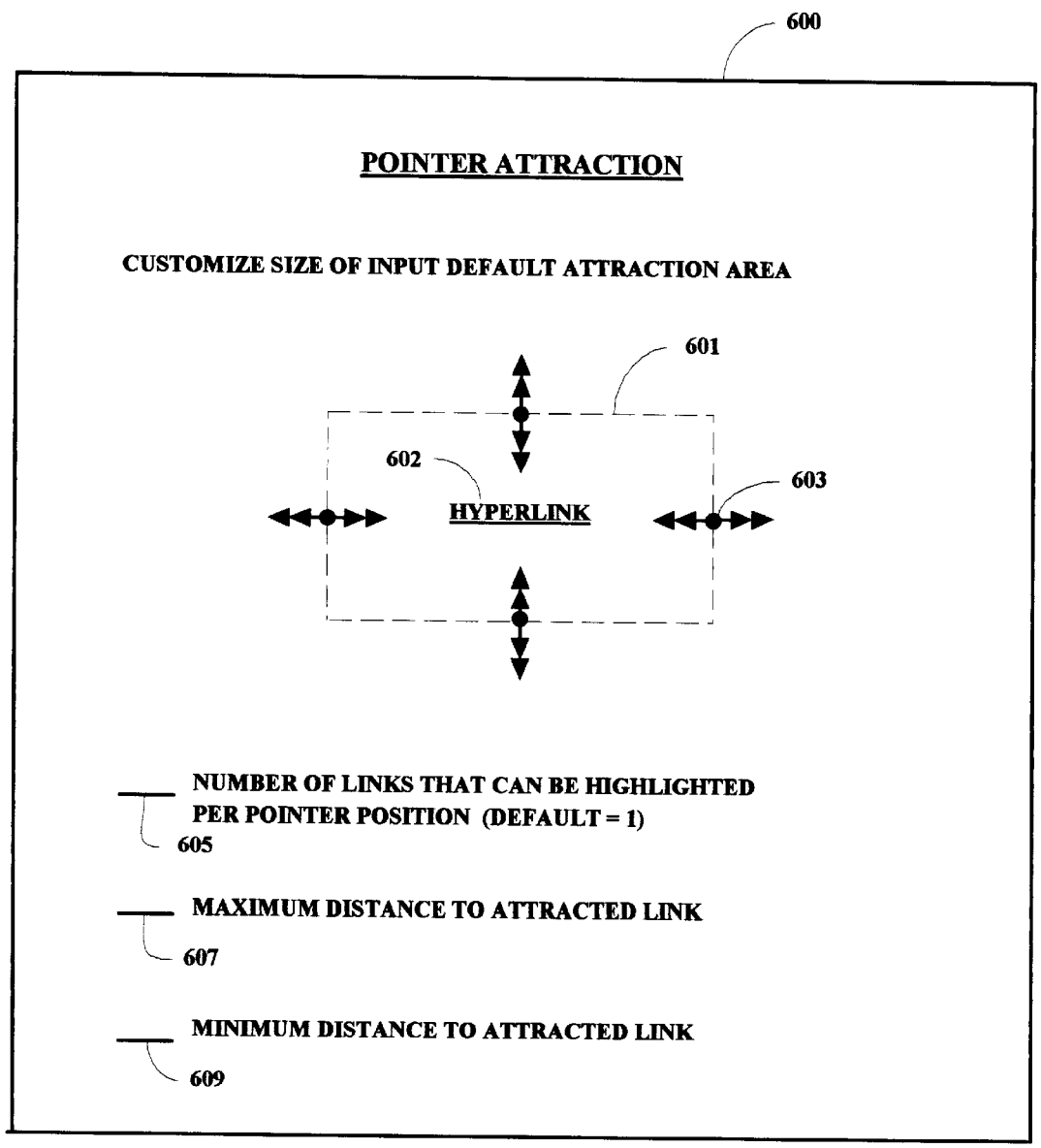
FIG. 6 is an exemplary screen display illustrating a pointer-hyperlink attraction function and control implementation.

As further illustrated in FIG. 3, one exemplary embodiment of the present invention may be implemented within a browser application and included within the "Edit" function. As shown, when the "Edit" function button is pointed to by the pointer 313 and the appropriate mouse button is actuated, a sub-menu 315 appears in which one of the selections is designated "Preferences". If the "Preferences" item is selected, another sub-menu 317 appears which includes a series of additional selectable functions including separately selectable items designated "Mouse Controls" 319, "Scroll Box Controls" 321 and "Pointer Attraction Controls" 323. If the "Mouse Controls" area 319 is selected, a screen corresponding to the example illustrated in FIG. 4 is presented. Similarly, if the "Scroll Box Controls" area 321 is selected, a screen corresponding to the example illustrated in FIG. 5 is presented, and if the "Pointer Attraction Controls" area 323 is selected, a screen corresponding to that illustrated in FIG. 6 is presented.

As shown in FIG. 4, the "Mouse Controls" menu screen 400 includes several sections allowing user selection of criteria for controlling the relationship between physical movement by a hardware pointing device such as a mouse device, and displayed pointer or cursor movement on a display screen. In a first section 401 of the illustrated example, a user is able to use a mouse pointer 402 to point to, and slide, screen indicia 403 and 404 between Minimum and Maximum settings to control movement of a screen pointer or cursor along the "X" or horizontal axis on a display, to user initiated mouse movements on a mouse pad. Movement of the first slider indicium 403 controls the sensitivity of the input mouse movement between a minimum sensitivity and a maximum sensitivity, and movement of the second slider or indicium 404 determines the corresponding movement of the screen pointer or cursor on the display screen. In a second section, a user is similarly able to control movement of a screen pointer along a "Y" or vertical axis of a display screen in response to mouse movements between "Minimum" and "Maximum" settings by pointing to and moving a mouse slider 406 and a pointer slider 407 between "MIN" and "MAX" markings on a displayed scale.

Additional sections may be added to allow user inputs to control pointer movement along different axes. For example, as illustrated, sections 409 and 413 allow user input to control mouse movement and corresponding cursor movement along first and second 45 degree axes "NE/SW" and "NW/SE", respectively, on the display screen.

In another screen section 417, allowable pointer movements are displayed for selection by a user. For example, if a user wanted to allow only the closest 45 degree movements by the screen pointer in response to irregular cursor movements, the user would "click on" or check the box corresponding to "45 DEGREES ONLY". An "EDGE HIT" selection by a user would enable a Page-down/Page-up function by which a page-down or page-up function would be initiated when the pointer hits the bottom of a displayed page or the top of a displayed page, respectively. A "HYPERLINK ATTRACTION ENABLED" selection would enable a hyperlink attraction function by which displayed hyperlinks or function buttons may be more easily actuated by a user. This hyperlink or function attraction feature, when enabled by the user, will effectively enlarge the screen display area associated with a hyperlink or function selection within which a "point-and-click" may be actuated. This function has many possible implementations and is discussed in further detail in connection with FIG. 6.

When the SCROLL BOX CONTROLS selection 321 (FIG. 3) is made by the user, the CONFIGURE SCROLL BOX (CSB) screen 500, as shown in FIG. 5, is presented to the user. The CSB screen 500 allows a user to provide inputs to define the appearance of scroll boxes on the user's display screen. A user may select a default size of a scroll box by checking the default box 501. In the example, the default size for scroll boxes is 1" by 2". A user may also customize the size of scroll boxes which are presented on the user's screen by checking the CUSTOMIZE box 503. The user may then shape the size of displayed scroll boxes by moving the sides of a displayed box 505. This may be done, for example, by pointing to displayed movement arrows 507 on the sides of the displayed box 505 and then sliding the movement points until the displayed box 505 is in the desired size and/or shape. Additional selections allow a user to define scroll box size 509 by designating a number of boxes which may be displayed across a page. A user may also choose to make the scroll boxes invisible 511 on the display, and to allow movement 513 through multiple scroll boxes. The number of boxes through which the mouse pointer can move through 515 is also selectable in the example.

As earlier noted, if a user selects POINTER ATTRACTION 323 from the PREFERENCES sub-menu 317 (FIG. 3), then the selection screen 600 as shown in FIG. 6 appears. User inputs to the FUNCTION/POINTER ATTRACTION screen 600 allow the user to designate various characteristics of the pointer attraction function. The pointer attraction function, as hereinbefore noted, allows an actuation of a displayed hyperlink, or an actuation of another screen selectable function (such as a "Spell Check" function or a "Stop" function), to be effected when a screen mouse pointer is within a selected area around a hyperlink or function button, even though the pointer is not exactly within the designated displayed hyperlink or function button area. Thus, a hyperlink, for example, may be actuated (if this hyperlink attraction feature is enabled according to FIG. 4) even though the screen pointer is outside of a designated hyperlink screen area. This feature aids users who are less capable of accomplishing the precise pointer movements sometimes required in manipulating a screen pointer to a hyperlink or other selectable function screen area in order to navigate to a Web page designated by a displayed hyperlink or effect a selected function. The selection screen 600 allows user input to designate the size of a default attraction area 601 on a display screen relative to a displayed hyperlink area 602. This may be accomplished for example by pointing to and sliding displayed movement points, such as point 603, until the desired size and shape of the sensitive attraction area 601 surrounding a hyperlink 602 is achieved. Other possible selections include the number of links 605 that can be highlighted per hyperlink attraction area, the maximum distance 607 to the attracted link or function and the minimum distance 609 to the attracted link or function 609. Thus the pointer-hyperlink/function attraction feature allows a user, with limited mouse movement capabilities, to navigate through complicated hyperlink networks and functions through the World Wide Web for example, while obviating the precise mouse movements otherwise required for such journeys, by effectively enlarging "point-and-click" screen areas which may be used to actuate selected hyperlinks and/or functions.

Figure 7:
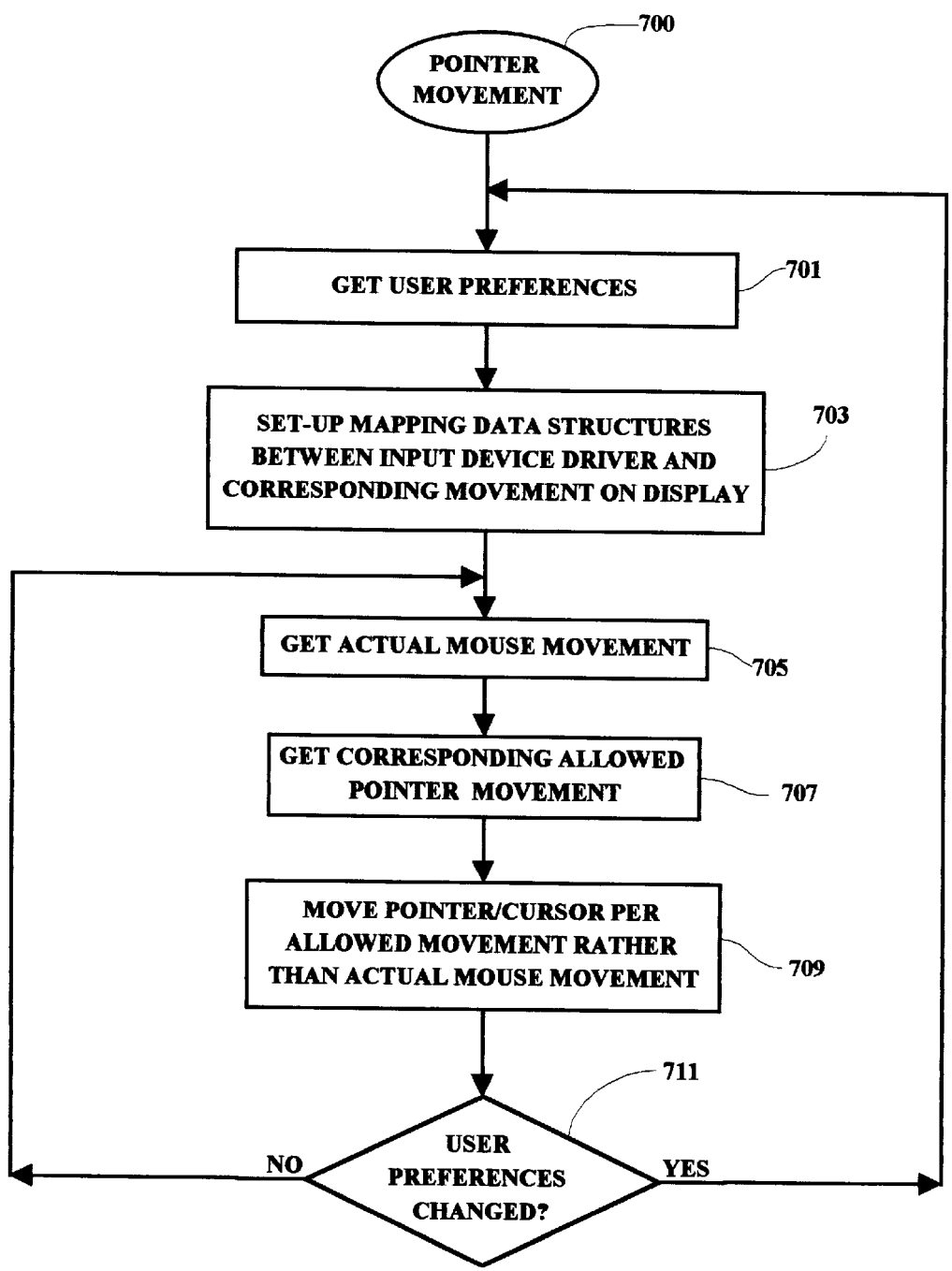
FIG. 7 is a flow chart illustrating an operational sequence in one exemplary embodiment of the methodology disclosed herein.

FIG. 7 illustrates an operational flow sequence in an exemplary implementation of the disclosed methodology. As shown, the pointer movement control function 700 initially gets 701 the user preferences which have been entered as hereinbefore explained. Next, mapping data structures between input device drivers and corresponding movements on the display are set up 703. Next, the actual mouse movement is obtained (on a continuing basis) 705 and the corresponding "allowed" pointer movements are obtained 707. The pointer or cursor is then moved 709 as determined by the allowed movement which most closely corresponds to the actual mouse movement rather than to the precise actual mouse movement. This function normalizes the pointer movement to a smooth and purposeful movement and overrides or disregards irregular actual mouse movements thereby enabling those with only limited movement control to more effectively utilize a screen selection protocol based on actual mouse movements. A check is then made to determine if the user preferences have changed 711. If the user preferences have changed 711, then the new user preferences are obtained 701 and the methodology continues as hereinbefore explained. If the user preferences have not changed 711 then the next mouse movement is obtained 705 and the processing continues from that point.

Figure 8:
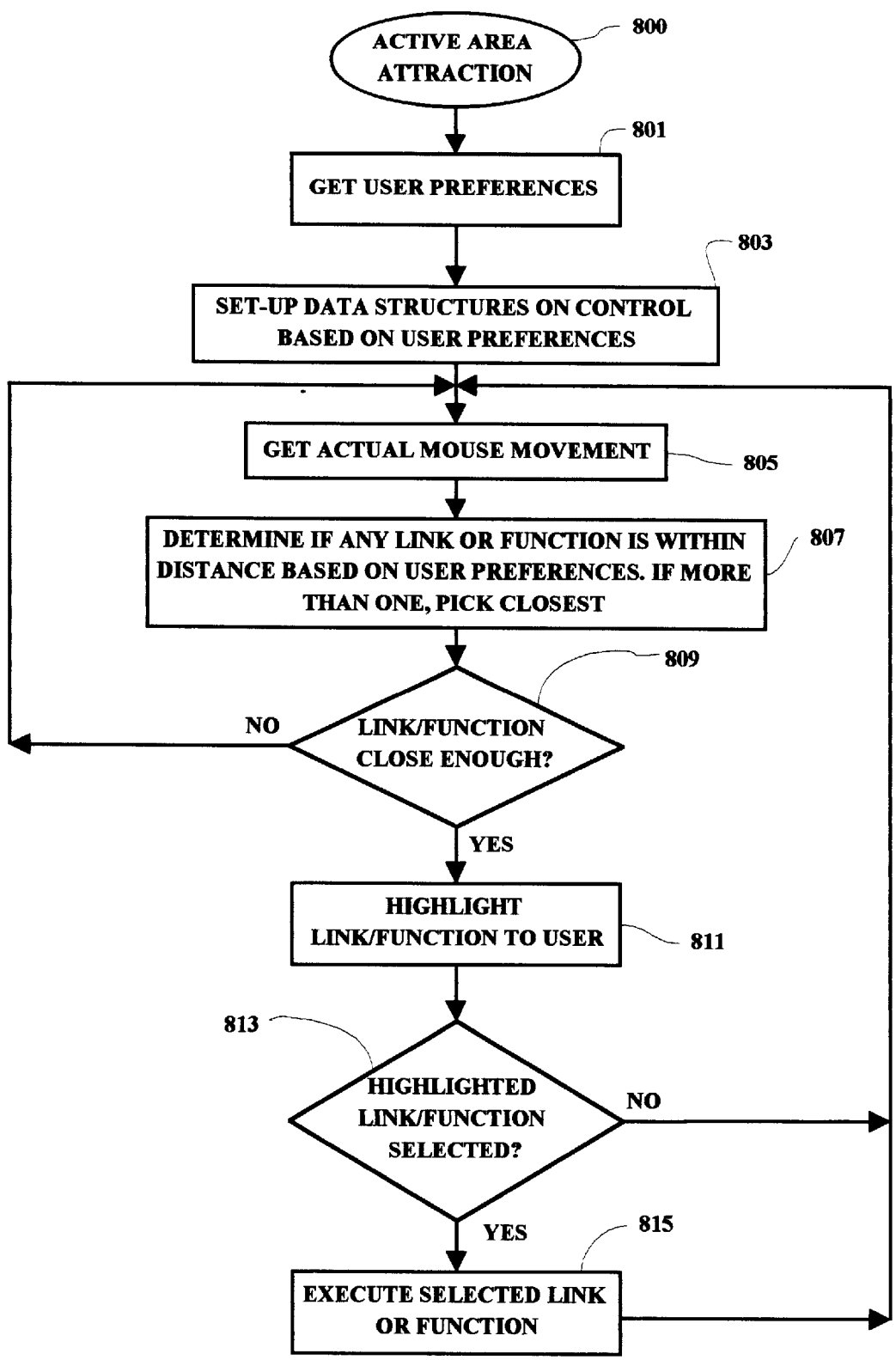
FIG. 8 is a flow chart illustrating an exemplary pointer-hyperlink attraction function.

The methodology for the hyperlink or function attraction operation is illustrated in the flow chart shown in FIG. 8. As illustrated, the active area attraction function 800 initially gets the user preferences 801. Data structures are then set up 803 based on the user preferences. The actual mouse movement is ascertained 805 and the closest hyperlink or selectable function is determined 807 based on the user preference input to the Function/Pointer Attraction screen 600. A determination is then made 809 whether any selectable hyperlink or function button is close enough to the pointer position. If not, the process returns to get the next mouse movement 805. If a selectable hyperlink or function is close enough to the pointer position 809 then the particular hyperlink or function is highlighted 811. If the user then selects the highlighted link or function 813 by, for example, clicking on a mouse button, then the selected hyperlink or function is executed to navigate to the appropriate URL (Uniform Resource Locator) or to actuate the selected function as appropriate. After the selected hyperlink or function is executed 815, or if the highlighted link or function is not selected 813, then in either case the process returns to get the next mouse movement 805.

One of many possible exemplary pseudocode listings for implementing the user-input scroll box controls is illustrated below.

```
Get Actual Mouse Movement
Allowed? Get direction x, y, 45 degree axis
    if X direction Allowed and movement was detected in
        x direction get Desired Movement distance in X
        direction
    if Y direction Allowed and Movement was detected in
        Y direction get Desired Movement distance in Y
        direction
    if 45 degrees (NE) Allowed and Movement was
        detected in 45 degrees NE direction get Desired
        Movement distance in 45 degrees NE direction
    if 45 degrees (NW) Allowed and Movement was
        detected in 45 degrees NW direction get Desired
        Movement distance in 45 degrees NW direction
    if top or bottom of scrollbox was hit, and edge-hit
        enabled, then page-up or page-down, respectively
check if Desired movement OK (mainly for multiple
    scroll box case)
    get number of Scroll boxes a movement can pass
        through (default=1)
    get maximum allowed movement length based on
        scroll box size by using previous value as a multi-
        plier
    get previous position of cursor
    loop through each direction and check if desired Dis-
        tance can be performed. It cannot be performed if the
        cursor is on the edge of the last allowed scroll box
!
```

The method and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored on a CD, disk or diskette (portable or fixed), or other memory device, from which it may be loaded into memory and executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. In a display system including a display device and an input device, said input device being arranged for effecting a movement of a pointer indicium on a display screen of said display device, a method for controlling predetermined aspects of scroll boxes appearing on said display screen, each of said scroll boxes displaying an application working area within a portion of said display screen, said method comprising:

presenting a scroll box control screen on said display device, said scroll box control screen including a visual model of a scroll box; and enabling a changing of at least one dimension of said visual model by manipulating said input device relative to said visual model, said changing being effective to cause a corresponding change in one or more scroll boxes appearing on said display screen.

2. The method as set forth in claim 1 wherein said input device is a mouse device, said mouse device being selectively movable to cause a corresponding movement of said pointer indicium on a display screen of said display device.

3. The method as set forth in claim 2 and further including:

changing at least one dimension of said visual model by operating said mouse device and moving a selected side of said visual model using said pointer indicium.

4. The method as set forth in claim 3 and further including means for defining a standard size for scroll boxes presented on said display device based on a number of scroll boxes presented on said display screen.

5. The method as set forth in claim 4 and further including selectively rendering selective ones of said scroll boxes invisible on said display screen.

6. The method as set forth in claim 5 and further including selectively enabling movement of said pointer indicium through multiple scroll boxes on said display screen.

7. The method as set forth in claim 6 and further including enabling a selection of a number of scroll boxes through which said pointer indicium may move.

8. The method as set forth in claim 1 wherein said input device comprises a roller ball device wherein rotation of said roller ball device causes a corresponding movement of said pointer indicium.

9. The method as set forth in claim 1 wherein said input device comprises a movable arm wherein movement of said movable arm causes a corresponding movement of said pointer indicium.

10. A storage medium including machine readable coded indicia, said storage medium being selectively coupled to a reading device, said reading device being selectively coupled to processing circuitry for reading said machine readable coded indicia and provide program signals representative thereof, said program signals being effective to cause a presentation of a selection screen on a display device, said program signals being further effective for:

presenting a scroll box control screen on said display device, said scroll box control screen including a visual model of a scroll box; and enabling a changing of at least one dimension of said visual model by manipulating said input device relative to said visual model, said changing being effective to cause a corresponding change in one or more scroll boxes appearing on said display screen.

11. The storage medium as set forth in claim 10 wherein said input device is a mouse device, said mouse device being selectively movable to cause a corresponding movement of said pointer indicium on a display screen of said display device.

12. The storage medium as set forth in claim 11 and further including:

changing at least one dimension of said visual model by operating said mouse device and moving a selected side of said visual model using said pointer indicium.

13. The storage medium as set forth in claim 12 and further including means for defining a standard size for scroll boxes presented on said display device based on a number of scroll boxes presented on said display screen.

14. The storage medium as set forth in claim 13 and further including selectively rendering selective ones of said scroll boxes invisible on said display screen.

15. The storage medium as set forth in claim 14 and further including selectively enabling movement of said pointer indicium through multiple scroll boxes on said display screen.

16. The storage medium as set forth in claim 15 and further including enabling a selection of a number of scroll boxes through which said pointer indicium may move.

17. The storage medium as set forth in claim 10 wherein said input device comprises a roller ball device wherein rotation of said roller ball device causes a corresponding movement of said pointer indicium.

18. The storage medium as set forth in claim 10 wherein said input device comprises a movable arm wherein movement of said movable arm causes a corresponding movement of said pointer indicium.

19. A system comprising:

a system bus;

a CPU device connected to said system bus;

a memory device connected to said system bus;

a display device connected to said system bus; and an input device connected to said system bus, said input device being arranged to enable a user input to determine movement of a pointer indicium on said display device, said system being arranged for presenting a scroll box control screen on said display device, said scroll box control screen including a visual model of a scroll box whereby a changing of at least one dimension of said visual model is accomplished by manipulating said input device relative to said visual model, said changing being effective to cause a corresponding change in one or more scroll boxes appearing on said display screen.

* * * * *